United States Patent
Choi et al.

(10) Patent No.: US 8,797,963 B2
(45) Date of Patent: Aug. 5, 2014

(54) METHOD FOR TRANSMITTING UPLINK SIGNAL FOR LOCATION-BASED SERVICE AND USER DEVICE, AND METHOD FOR MEASURING LOCATION OF USER DEVICE USING UPLINK SIGNAL AND BASE STATION

(75) Inventors: Jin Soo Choi, Anyang-si (KR); Han Gyu Cho, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 13/522,233

(22) PCT Filed: Jan. 13, 2011

(86) PCT No.: PCT/KR2011/000248
§ 371 (c)(1),
(2), (4) Date: Jul. 13, 2012

(87) PCT Pub. No.: WO2011/093605
PCT Pub. Date: Aug. 4, 2011

(65) Prior Publication Data
US 2012/0320845 A1    Dec. 20, 2012

Related U.S. Application Data

(60) Provisional application No. 61/298,909, filed on Jan. 27, 2010.

(30) Foreign Application Priority Data

Jan. 6, 2011   (KR) .................. 10-2011-0001278

(51) Int. Cl.
*H04W 4/00*   (2009.01)

(52) U.S. Cl.
USPC ......... 370/328; 370/236; 370/252; 455/456.1

(58) Field of Classification Search
USPC ......... 370/229, 236, 241, 252, 310, 328, 351; 455/404.2, 414.2, 433, 440, 456.1, 455/456.2, 456.5, 456.6
See application file for complete search history.

(56) References Cited

U.S. PATENT DOCUMENTS

| | | | |
|---|---|---|---|
| 5,068,916 A | 11/1991 | Harrison et al. | |
| 5,684,794 A | 11/1997 | Lopez et al. | |
| 8,391,894 B2 * | 3/2013 | Venkatachalam | 455/456.3 |
| 2003/0096612 A1 * | 5/2003 | Kim et al. | 455/435 |
| 2009/0092037 A1 * | 4/2009 | Hadad | 370/207 |
| 2010/0228846 A1 * | 9/2010 | Choi | 709/223 |
| 2010/0273488 A1 * | 10/2010 | Kim | 455/436 |
| 2011/0096769 A1 * | 4/2011 | Sim | 370/352 |
| 2011/0140956 A1 * | 6/2011 | Henry et al. | 342/357.3 |

* cited by examiner

*Primary Examiner* — Kwang B Yao
*Assistant Examiner* — Nguyen Ngo
(74) *Attorney, Agent, or Firm* — Birch, Stewart, Kolasch & Birch, LLP

(57) ABSTRACT

In the present invention, an uplink synchronization signal for measuring a location of a user device is assigned to a predetermined uplink sub-frame and a predetermined sub-band and is transmitted to one or adjacent cells as well as a serving cell in a predetermined period. Since the synchronization signal for measuring the location is transmitted to a plurality of cells through the same wireless resource, other date are not transmitted to the same wireless resource and a near-far effect can be reduced in each cell.

18 Claims, 9 Drawing Sheets

Fig. 5
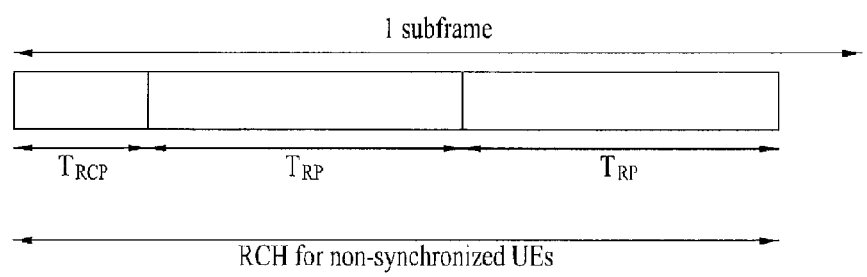
(a) Format 0
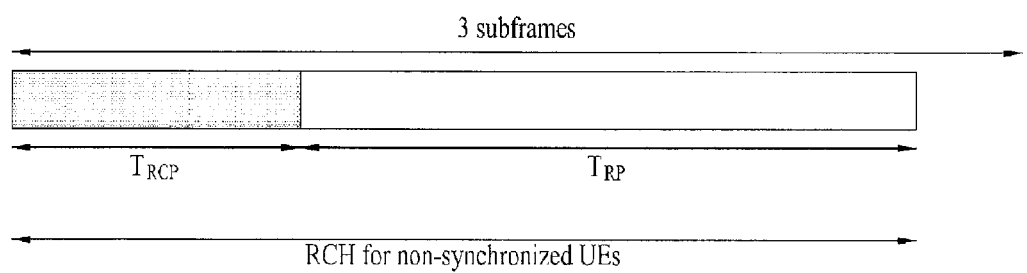
(b) Format 1

METHOD FOR TRANSMITTING UPLINK SIGNAL FOR LOCATION-BASED SERVICE AND USER DEVICE, AND METHOD FOR MEASURING LOCATION OF USER DEVICE USING UPLINK SIGNAL AND BASE STATION

CROSS REFERENCE TO RELATED APPLICATIONS

This application is the National Phase of PCT/KR2011/000248 filed on Jan. 13, 2011, which claims priority under 35 U.S.C. 119(e) to U.S. Provisional Application No. 61/298,909 filed on Jan. 27, 2010 and under 35 U.S.C. 119(a) to Patent Application No. 10-2011-0001278 filed in Korea on Jan. 6, 2011, all of which are hereby expressly incorporated by reference into the present application.

TECHNICAL FIELD

The present invention relates to a wireless communication system, and more particularly, to a method for transmitting, by a user equipment, signals for location based service in a wireless communication system and an apparatus for the same. Also, the present invention relates to a method for measuring a location of a user equipment by receiving signals for location based service and an apparatus for the same.

BACKGROUND ART

In order to provide communication services of high quality in a communication system, a location measurement system for determining a location of a user equipment within a network or locations of entities related to the user equipment more accurately has been required.

Various methods for measuring a location of a user equipment may be roughly divided into two methods. The one is a downlink based location measurement method for measuring the location of the user equipment based on downlink signals transmitted from a base station to the user equipment, and the other one is an uplink based location measurement method for measuring the location of the user equipment based on uplink signals transmitted from the user equipment to the base station. In case of the downlink based location measurement, the user equipment receives downlink signals transmitted from a plurality of cells, and calculates its location by measuring delay time of the downlink signals. On the other hand, in case of the uplink based location measurement, the base station measures the location of the user equipment by measuring delay time of the uplink signals transmitted from the user equipment to the base station and neighboring base station(s). In other words, a geographical location of the user equipment is calculated by basically measuring delay time of signals transmitted from a plurality of cells to the user equipment or delay time of signals transmitted from the user equipment to the plurality of cells. Accordingly, in order to measure the location of the user equipment, a plurality of signals are required. Based on this, various methods for calculating a location of a user equipment are provided. However, it is general that a time difference of arrival (TDOA) scheme or a time of arrival (DOA) scheme is mainly used.

FIG. 1 is a conceptual view illustrating a TDOA scheme for measuring a location of a user equipment.

Referring to FIG. 1, in the TDOA scheme, a base station of a serving cell or anchor cell measures the location of the user equipment by using delay time of signals transmitted from the user equipment to a plurality of cells including the serving cell.

Meanwhile, in order to provide a communication service of high quality, the need of a location measurement scheme for determining a location of a user equipment within a network and/or locations of entities related to the user equipment more exactly has been increased. In this respect, an advanced method for determining a location while minimizing an effect on a structure of an existing radio frame should be provided.

SUMMARY OF THE INVENTION

An object of the present invention is to provide a method for transmitting a location measuring signal for location based service while minimizing an effect on a structure of an existing radio frame.

Another object of the present invention is to provide a method for allocating a location measurement uplink signal for location based service to a superframe while minimizing an effect on a reference signal and a control signal, which are allocated to an existing radio frame.

It is to be understood that technical objects to be achieved by the present invention are not limited to the aforementioned technical objects and other technical objects which are not mentioned will be apparent from the following description to the person with an ordinary skill in the art to which the present invention pertains.

In one aspect of the present invention, a method for transmitting location measurement signals for a location based service (LBS) from a user equipment in a wireless communication system comprises the steps of allocating a synchronization signal for location measurement of the user equipment to a predetermined uplink subframe and a predetermined subband; and transmitting the synchronization signal for location measurement to a serving base station and one or more neighboring base stations at a predetermined period through the predetermined subband for the predetermined uplink subframe.

In another aspect of the present invention, a method for receiving location measurement signals for a location based service (LBS) in a base station of a wireless communication system comprises the steps of receiving a synchronization signal for location measurement of a user equipment at a predetermined period through a predetermined uplink subframe and a predetermined subband; measuring location information of the user equipment on the basis of the synchronization signal; receiving location information of the user equipment, that a neighboring base station measures on the basis of the synchronization signal transmitted by the user equipment to the neighboring base station through the predetermined uplink subframe and the predetermined subband, from the neighboring base station; and calculating the location of the user equipment on the basis of the location information measured by the base station and the neighboring base station.

In still another aspect of the present invention, a user equipment for transmitting location measurement signals for a location based service (LBS) in a wireless communication system comprises a receiver configured to receive signals; a transmitter configured to transmit the signals; and a processor configured to control the receiver and the transmitter, wherein the processor is configured to allocate a synchronization signal for location measurement of the user equipment to a predetermined uplink subframe and a predetermined subband, and controls the transmitter to transmit the synchronization signal for location measurement to a serving base station and one or more neighboring base stations at a predetermined period through the predetermined subband for the predetermined uplink subframe.

In further still another aspect of the present invention, a base station for receiving location measurement signals for a location based service (LBS) in a wireless communication system comprises a receiver configured to receive signals; a transmitter configured to transmit the signals; and a processor configured to control the receiver and the transmitter, wherein the processor controls the receiver to receive a synchronization signal for location measurement of a user equipment at a predetermined period through a predetermined uplink subframe and a predetermined subband, measures location information of the user equipment on the basis of the synchronization signal, receives location information of the user equipment, that a neighboring base station on the basis of the predetermined uplink subframe and the synchronization signal transmitted to the neighboring base station through the predetermined subband, from the neighboring base station, and calculates the location of the user equipment on the basis of the location information measured by the base station and the neighboring base station.

In each aspect of the present invention, periodicity information indicating the predetermined period may be transmitted from the serving base station to the user equipment.

In each aspect of the present invention, subframe information indicating the predetermined uplink subframe may be transmitted from the serving base station to the user equipment.

In each aspect of the present invention, the predetermined uplink subframe may previously be defined for allocation of the synchronization signal.

In each aspect of the present invention, the predetermined subband may have the lowest index or the highest index, among a plurality of subbands within a frequency partition.

In each aspect of the present invention, subband information indicating the predetermined subband may be transmitted from the serving base station to the user equipment, and the user equipment may allocate the synchronization signal to the predetermined subband indicated by the subband information.

The aforementioned technical solutions are only a part of the embodiments of the present invention, and various modifications to which technical features of the present invention are applied could be understood by the person with ordinary skill in the art to which the present invention pertains, based on the following detailed description of the present invention.

According to the embodiments of the present invention, it is advantageous in that it is possible to transmit a location measurement signal for location based service while minimizing an effect on a structure of an existing radio frame.

Also, according to the embodiments of the present invention, it is advantageous in that it is possible to allocate a location measurement signal for location based service to a superframe while minimizing an effect on a reference signal and a control signal, which are allocated to an existing radio frame.

Also, according to the embodiments of the present invention, it is advantageous in that it is possible to reduce inter-cell interference of cells that take part in location measurement, thereby improving location measurement performance of the user equipment based on the location measurement signal.

Also, according to the embodiments of the present invention, it is advantageous in that the user equipment and the base station can know time resources on which the location measurement signal is transmitted, whereby the user equipment and the base station can easily recognize the corresponding time resources.

Also, according to the embodiments of the present invention, it is advantageous in that the user equipment and the base station can know frequency resources on which the location measurement signal is transmitted, whereby the user equipment and the base station can easily recognize the corresponding frequency resources.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 and FIG. 6 are diagrams illustrating structures of a ranging channel that may be used in the embodiments of the present invention;

DETAILED DESCRIPTION OF THE INVENTION

Figure 1:
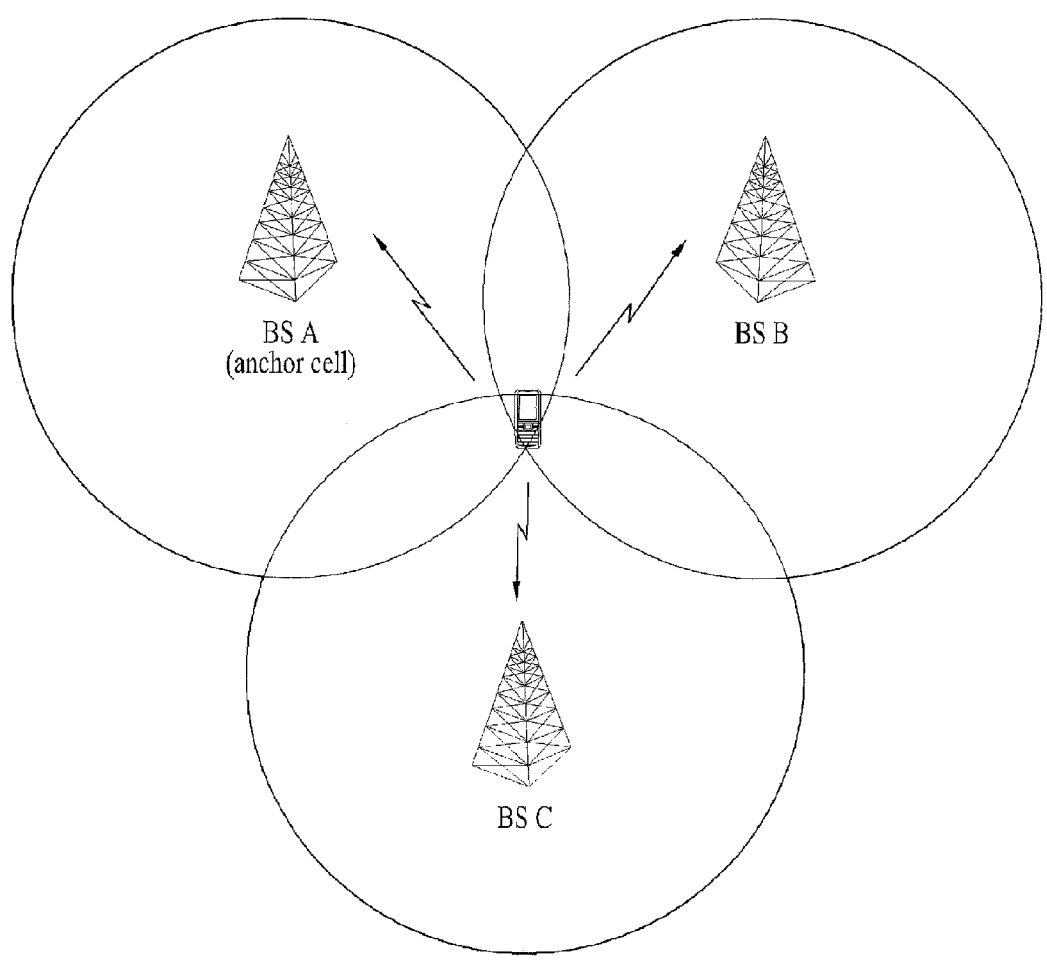
FIG. 1 is a conceptual diagram illustrating a TDOA scheme for measuring a location of a user equipment.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system corresponding to an IEEE 802.16 system, the following description can be applied to other mobile communication systems except unique features of the IEEE 802.16 system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) denotes a mobile or fixed type user terminal. Examples of the terminal equipment include various equipments that transmit and receive user data and/or various kinds of control information to and from a base station. The user equipment (UE) may be referred to as a terminal equipment (TE), a mobile station (MS), a mobile terminal (MT), a user terminal (UT), a subscriber station (SS), a wireless device, a personal digital assistant (PDA), a wireless modem, or a handheld device. Also, in the present invention, a base station (BS) means a fixed station that performs communication with a user equipment and/or another base station, and exchanges various kinds of data and control information with the user equipment and another base station. The base station may be referred to another terminology such as an evolved-NodeB (eNB), a base transceiver system (BTS), and an access point (AP).

A wireless communication system to which the embodiments of the present invention are applied includes a plurality of base stations. Each base station provides a communication service to user equipment(s) located in a specific local zone (generally referred to as a cell). The cell can be divided into a plurality of local zones (referred to as sectors).

Hereinafter, LBS superframe/frame/subframe/symbol represents superframe/frame/subframe/symbol to which a reference signal for location based service (LBS) is allocated or can be allocated. The reference signal for LBS or LBS location measurement signal means a special waveform signal transmitted from a base station for location specific measurement that enables more accurate location measurement. The base station according to the embodiments of the present invention, which will be described later, can signal a location of a special waveform to a user equipment. The user equipment can detect the special waveform transmitted in accordance with the embodiments of the present invention, perform related measurement, and report the measured result to the base station.

Also, if a special signal within superframe/frame/subframe/symbol is not transmitted from its transmission location, it will be expressed that transmission of the special signal has been dropped, muted, null or blanked.

Meanwhile, in the present invention, if the special signal is allocated to superframe/frame/subframe/symbol/carrier/subcarrier, it means that the special signal is transmitted through the corresponding carrier/subcarrier during a period/timing of the corresponding superframe/frame/subframe/symbol.

As described in FIG. 1, in order to measure a location of a user equipment, signal transmission/arrival timing from each base station to the user equipment can be used. Examples of signals used for timing measurement include downlink pilot and advanced preamble (A-preamble) in a downlink, and also include uplink pilot, a ranging channel (RCH) and a ranging preamble in an uplink. Hereinafter, a location based service based on a downlink signal will be referred to as DL LBS, and a location based service based on an uplink signal will be referred to as UL LBS.

Hereinafter, a method for transmitting an uplink signal for location measurement by using a ranging channel and a user equipment for performing the method, and a method for performing location measurement by receiving an uplink signal for location measurement and a base station for performing the method will be described. A ranging channel on which the uplink signal for location measurement is transmitted will be referred to as LBS ranging channel. Hereinafter, embodiments of the present invention for allocating a location measurement ranging preamble for more accurate location measurement while minimizing an influence on allocation/measurement of an existing (in other words, legacy) ranging channel and transmission of existing system information and control information will be described.

Figure 2:
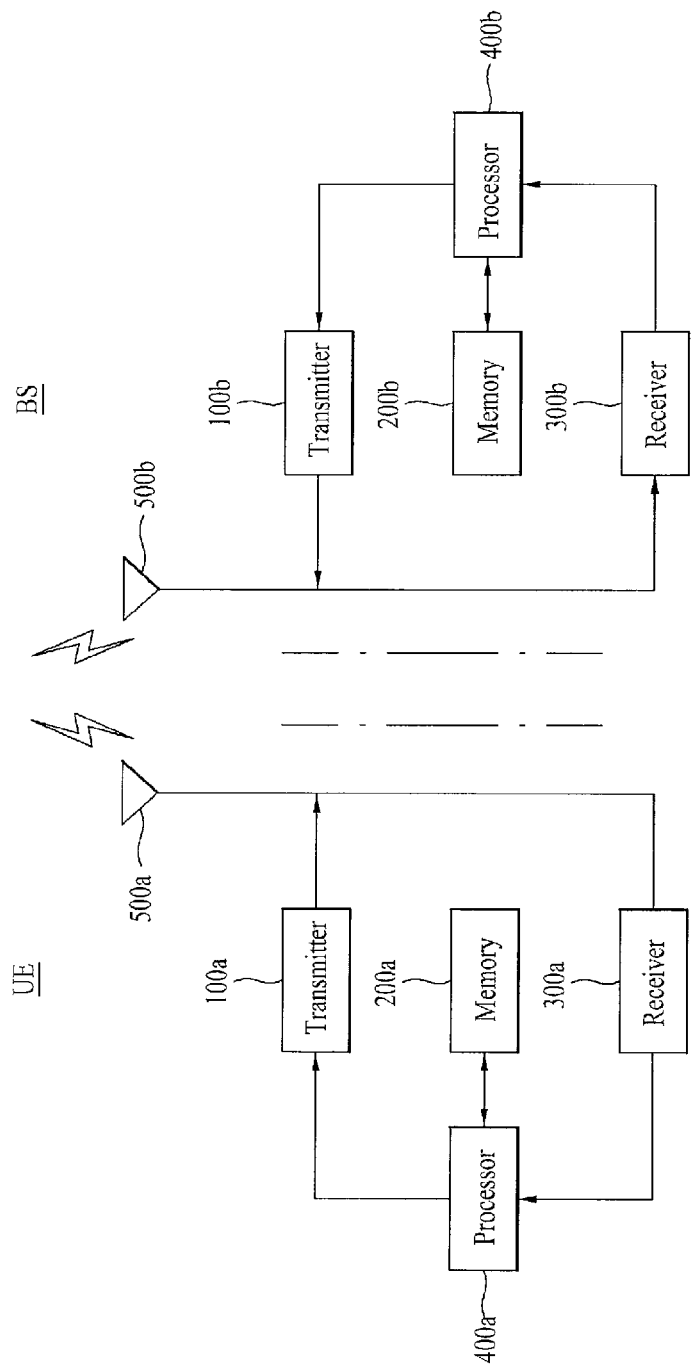
FIG. 2 is a block diagram illustrating elements of a user equipment and a base station, which perform the present invention.

FIG. 2 is a block diagram illustrating a user equipment and a base station for implementing the present invention.

The user equipment serves as a transmitting apparatus on the uplink and as a receiving apparatus on the downlink. By contrast, the base station may serve as a receiving apparatus on the uplink and as a transmitting apparatus on the downlink.

The user equipment and the base station include antennas $500a$ and $500b$ for receiving information, data, signals, and/or messages, transmitters $100a$ and $100b$ for transmitting messages by controlling the antennas $500a$ and $500b$, receivers $300a$ and $300b$ for receiving messages by controlling the antennas $500a$ and $500b$, and memories $200a$ and $200b$ for storing information associated with communication in the wireless communication system. The user equipment and the base station further include processors $400a$ and $400b$, respectively, which are adapted to perform the present invention by controlling the components of the user equipment and the base station, such as the transmitters $100a$ and $100b$, the receivers $300a$ and $300b$, and the memories $200a$ and $200b$. The transmitter $100a$, the memory $200a$, the receiver $300a$, and the processor $400a$ in the user equipment may be configured as independent components by separate chips or their separate chips may be incorporated into a single chip. Likewise, the transmitter $100b$, the memory $200b$, the receiver $300b$, and the processor $400b$ in the base station may be configured as independent components on separate chips or their separate chips may be incorporated into a single chip. The transmitter and the receiver may be configured as a single transceiver in the user equipment or the base station.

The antennas $500a$ and $500b$ transmit signals generated from the transmitters $100a$ and $100b$ to the outside, or transfer radio signals received from the outside to the receivers $300a$ and $300b$. If the transmitters $100a$ and $100b$ and/or the receivers $300a$ and $300b$ support a Multiple Input Multiple Output (MIMO) function using a plurality of antennas, each of them may be connected to two or more antennas.

The processors $400a$ and $400b$ generally provide overall control to the modules of the user equipment and the base station. Especially, the processors $400a$ and $400b$ may carry out a control function for performing the present invention, a Medium Access Control (MAC) frame variable control function based on service characteristics and a propagation environment, a power saving mode function for controlling idle-mode operations, a handover function, and an authentication and encryption function. The processors $400a$ and $400b$ may also be referred to as controllers, microcontrollers, microprocessors, microcomputers, etc. The processors $400a$ and $400b$ may be achieved by hardware, firmware, software, or their combination. In a hardware configuration, the processors $400a$ and $400b$ may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors $400a$ and $400b$, or may be stored in the memories $200a$ and $200b$ and driven by the processors $400a$ and $400b$.

The transmitters 100a and 100b perform predetermined coding and modulation for signals and/or data, which are scheduled by schedulers connected with the processors 400a and 400b and transmitted to the outside, and then transfer the modulated signals and/or data to the antennas 500a and 500b. For example, the transmitters 100a and 100b convert a transmission data stream to K signal streams by demultiplexing, channel coding, modulation, etc. The K signal streams are transmitted through the antennas 500a and 500b after being processed in transmission processors of the transmitters 100a and 100b. The transmitters 100a and 100b and the receivers 300a and 300b of the user equipment and the base station may be configured in different manners depending on the procedures of processing transmitted signals and received signals.

In the meantime, the processor 400a in the user equipment of the present invention may configure superframe/frame/subframe for location measurement for LBS in accordance with the embodiments of the present invention, which will be described later, while the processor 400a may control the transmitter 100b to allocate a location measurement signal or location measurement channel for UL LBS to predetermined frequency/time resources within the superframe/frame/subframe. The processor 400a may use information broadcasted from the base station in configuring the superframe/frame/subframe for location measurement.

Also, the processor 400b in the base station of the present invention may control the transmitter 100b to broadcast information on time resources in which the user equipment has to transmit a location measurement signal for UL LBS. The processor 400b may be configured to measure the location of the user equipment, which has transmitted the location measurement signal for UL LBS, on the basis of the location measurement signal for UL LBS, which has been transmitted on the predetermined frequency/time resources to the base station and neighboring base stations, in accordance with the embodiments of the present invention. Also, the processor 400b in the base station may control the transmitter 100b to transmit the measured result to the base station and/or the neighboring base stations. The processor 400b or the receiver 300b of the base station may separately be provided with a module that measures the location by using the location measurement signal for UL LBS.

Figure 3:
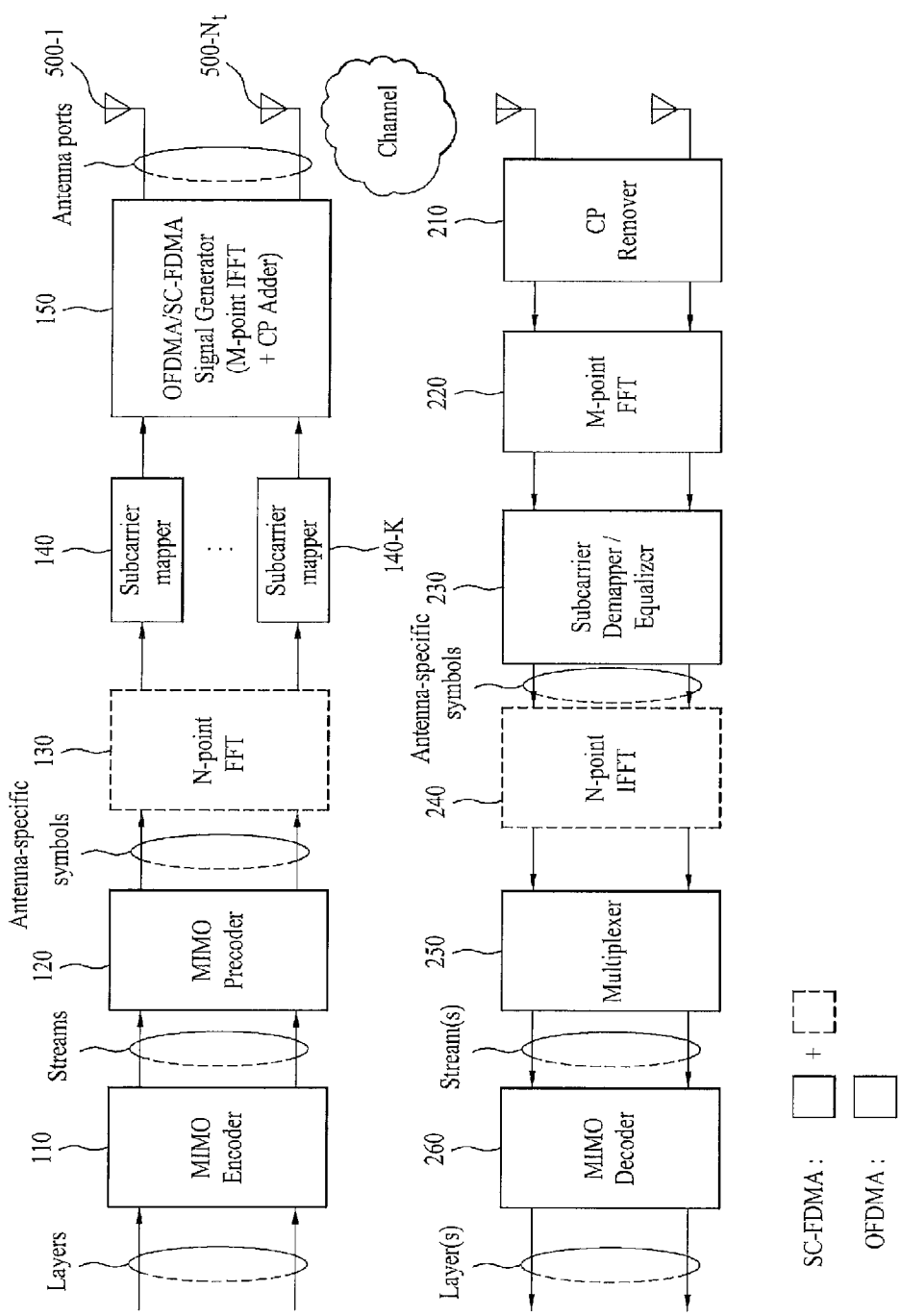
FIG. 3 is a diagram illustrating an example of a transmitter structure in a user equipment and a base station.

FIG. 3 is a block diagram illustrating an example of a transmitter in each of the user equipment and the base station. Operations of the transmitters 100a and 100b will be described below in more detail with reference to FIG. 3.

Referring to FIG. 3, each of the transmitters 100a and 100b includes a MIMO encoder 110, a MIMO precoder 120, subcarrier mappers 140-1 to 140-K, Orthogonal Frequency Division Multiplexing (OFDM) signal generators and $N_t$ transmission antennas 500-1 to 500-$N_t$.

The MIMO encoder 110 encodes a transmission data stream in accordance with a predetermined coding scheme to form coded data and modulates the coded data to be arranged as symbols representing positions on a signal constellation in a predetermined modulation scheme. The modulation scheme may be, but not limited to, any of m-Phase Shift Keying (m-PSK) and m-Quadrature Amplitude Modulation (m-QAM). For modulating the coded data, the encoder 110 may have an independent modulation module. In the mean time, the MIMO encoder 110 may define the layers of the input symbols such that the MIMO precoder 120 can distribute antenna-specific symbols to corresponding antenna paths. A layer refers to an information path input to the MIMO precoder 120, and the information path before the MIMO precoder 120 may be referred to as a virtual antenna or layer.

To define the layers of the symbols, the MIMO encoder 110 may be provided with a layer mapper configured as an independent module.

The MIMO precoder 120 outputs antenna-specific symbols to the subcarrier mappers 140-1 to 140-K by processing the received symbols in accordance with to a MIMO scheme according to the multiple transmission antennas 500-1 to 500-$N_t$. Mapping of the MIMO streams to the antennas 500-1 to 500-$N_t$ is performed by the MIMO precoder 120. Specifically, the MIMO precoder 120 multiplies the output x of the MIMO encoder 11 by an $N_t \times M_t$ precoding matrix W. The output of the MIMO precoder 120 may be represented as an $N_t \times N_F$ matrix z.

The subcarrier mappers 140-1 to 140-K allocate the antenna-specific symbols to appropriate subcarriers and multiplex them according to user equipments. In the meantime, the subcarrier mappers 140-1, . . . , 140-K may include LRU allocation block (not shown) that divides the modulated symbols into LRU sized segments and then allocates each segment to the LRU. Also, the subcarrier mappers 140-1, . . . , 140-K may include a mapping block (not shown) that maps the LRU into data burst. The data burst is allocated to the PRU in a physical frequency domain. Accordingly, the subcarrier mappers 140-1, . . . , 140-K serve to map the modulated data into the subcarriers in accordance with a mapping relation between the LRU and the PRU.

The OFDMA signal generator(s) 150 output OFDM symbols by modulating the antenna-specific symbols according to an OFDM modulation scheme. For example, the OFDMA signal generators 150 may perform Inverse Fast Fourier Transform (IFFT) for the antenna-specific symbols and insert a Cyclic Prefix (CP) into the resulting IFFT time-domain symbol. After digital-to-analog conversion and frequency upconversion, the OFDMA symbol is transmitted to the receiver through the transmission antennas 500-1 to 500-$N_t$. The OFDMA signal generator 150 may include an IFFT module, a CP inserter, a Digital-to-Analog Converter (DAC), and a frequency upconverter.

The OFDMA receivers 300a and 300b process signals in reverse to the operation of the OFDMA transmitters. More specifically, the receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. Signals received through the respective reception antennas are downconverted to baseband signals and recovered to an original data stream intended by the transmitter 100a or 100b, after multiplexing and channel demodulation. Therefore, each of the receivers 300a and 300b may have a signal recoverer for downconverting received signals to baseband signals, a multiplexer for multiplexing the baseband signals, and a channel demodulator for demodulating the multiplexed signal stream to a data stream. The signal recoverer, the multiplexer, and the channel demodulator may be configured as separate modules or incorporated into a single module. More specifically, the signal recoverer may include an Analog-to-Digital Converter (ADC) for converting an analog signal to a digital signal, a CP remover 210 for removing a CP from the digital signal, a Fast Fourier Transform (FFT) module 220 for generating frequency symbols by applying FFT to the CP-removed signal, and a subcarrier demapper/equalizer 230 for recovering the frequency symbols to antenna-specific symbols. A multiplexer 250 recovers MIMO streams from the antenna-specific symbols and a MIMO decoder 260 recovers the data streams transmitted by the transmitting apparatus from the MIMO streams.

Compared to the OFDMA transmitter, a Single Carrier Frequency Division Multiple Access (SC-FDMA) transmitter further includes an FFT module 130 before the subcarrier mappers 140 to 140-K. The SC-FDMA transmitter may significantly reduce Peak-to-Average Power Ratio (PAPR) by spreading a plurality of data in the frequency domain through FFT before IFFT is performed, relative to the OFDMA scheme. An SC-FDMA receiver further includes an IFFT module 240 after the subcarrier demapper/equalizer 230 in addition to the components of the OFDMA receiver. The SC-FDMA receiver processes a signal in reverse to the operation of the SC-FDMA transmitter.

The respective processors 400a and 400b of the transmission apparatus and the reception apparatus are connected with the corresponding transmitters 100a and 100b and control the operation of the aforementioned elements. Although it has been described in FIG. 2 and FIG. 3 that each of the transmitters 110a and 100b includes the MIMO encoder 110, the MIMO precoder 120, the subcarrier mappers 140-1 to 140-K, and the OFDMA/SC-FDMA signal generator 150, the processors 400a and 400b of the transmitting apparatus may include the MIMO encoder 110, the MIMO precoder 120, the subcarrier mappers 140-1 to 140-K, and the OFDMA/SC-FDMA signal generator 150. Likewise, although it has been described in FIG. 2 and FIG. 3 that each of the receivers 300a and 300b includes the signal recoverer, the multiplexer, and the MIMO decoder, the processors 400a and 400b of the receiving apparatus may include the signal recoverer, the multiplexer, and the MIMO decoder. Hereinafter, for convenience of description, the MIMO encoder 110, the MIMO precoder 120, the subcarrier mappers 140-1 to 140-K, and the OFDMA/SC-FDMA signal generator 150 are included in the transmitters 100a and 100b separated from the processors 400a and 400b that control the operations of the MIMO encoder 110, the MIMO precoder 120, the subcarrier mappers 140-1 to 140-K, and the OFDMA/SC-FDMA signal generator 150. And, the signal recoverer, the multiplexer, and the MIMO decoder are included in the receivers 300a and 300b separated from the processors 400a and 400b that control the operations of the signal recoverer, the multiplexer, and the MIMO decoder. However, the embodiments of the present invention can equally be applied to the case where the MIMO encoder 110, the MIMO precoder 120, the subcarrier mappers 140-1 to 140-K, and the OFDMA/SC-FDMA signal generator 150 are included in the processors 400a and 400b and the case where the signal recoverer, the multiplexer, and the MIMO decoder are included in the processors 400a and 400b.

The memories 200a and 200b may store programs required for signal processing and controlling of the processors 400a and 400b and temporarily store input and output information. Each of the memories 200a and 200b ma y be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 4:
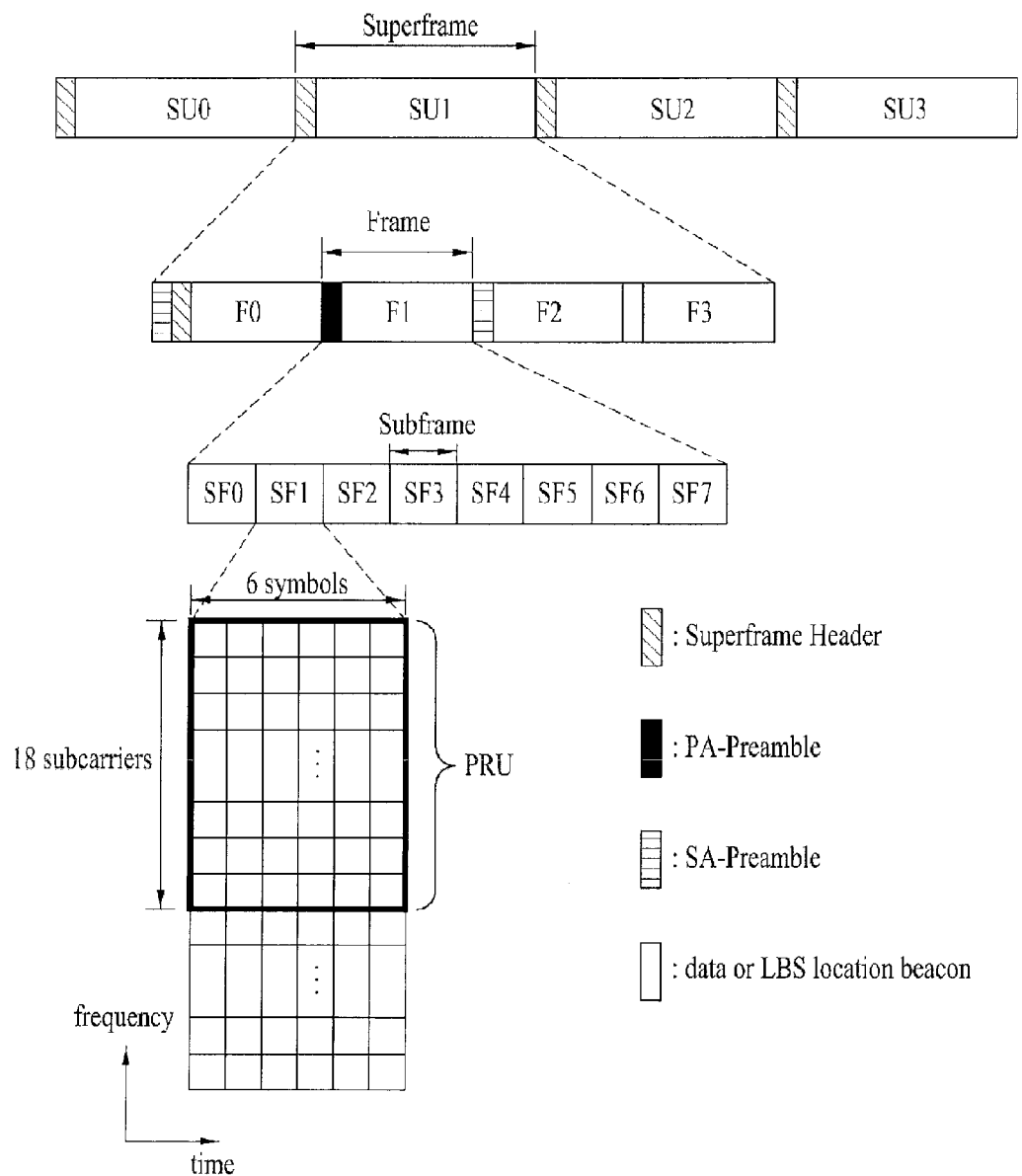
FIG. 4 is a diagram illustrating an example of a radio frame structure of IEEE 802.16m.

FIG. 4 illustrates a structure of a radio frame of the IEEE 802.16 system. The radio frame structure can be applied to a Frequency Division Duplex (FDD) mode, a Half Frequency Division Duplex (H-FDD) mode, and a Time Division Duplex (TDD) mode.

Referring to FIG. 4, the radio frame includes superframes SU0 to SU3 of 20 ms that support a bandwidth of 5 MHz, 8.75 MHz, 10 MHz or 20 MHz. Each superframe includes four frames F0 to F3 of 5 ms having the same size, and starts with a SuperFrame Header (SFH). The SFH carries essential system parameters and system configuration information. The SFH can be located within the first subframe of the superframe. The SFH can be classified into a Primary SFH (P-SFH) and a Secondary SFH (S-SFH). The P-SFH is transmitted per superframe. The S-SFH may be transmitted per superframe. The SFH can include a broadcast channel.

One frame can include eight subframes SF0 to SF7. The eight subframes within each from are numbered from 0 to 7. The frame can be configured differently depending on duplex modes. For example, since downlink transmission and uplink transmission are identified by frequency in the FDD mode, one frame includes either downlink subframes or uplink subframes. In the FDD mode, an idle time can exist at the end of each frame. On the other hand, since downlink transmission and uplink transmission are identified by time in the TDD mode, subframes within the frame are classified into a downlink subframe and an uplink subframe. In the TDD mode, an idle time referred to as a Transmit/receive Transition Gap (TTG) exists while the downlink is being changed to the uplink. Also, idle time referred to as a Receive/transmit Transition Gap (RTG) exists while the uplink is being changed to the downlink.

The subframe is a unit of a Transmission Time Interval (TTI). In other words, one TTI is defined by one or more subframes. In general, basic TTI is set to one subframe. The TTI means a time interval that a physical layer transmits coded packets through a radio interface. Accordingly, one subframe or a plurality of neighboring subframes can be used for transmission of data packets.

The subframe includes a plurality of OFDMA symbols in a time domain and a plurality of subcarriers in a frequency domain. The OFDMA symbols may be referred to as OFDMA symbols or SC-FDMA symbols depending on a multiplexing access mode. The number of OFDMA symbols included in one subframe can be varied depending on channel bandwidth and CP length. A type of the subframe can be defined depending on the number of OFDMA symbols included in the subframe. For example, the type of the subframe can be defined in such a manner that subframe type-1 includes six OFDMA symbols, subframe type-2 includes seven OFDMA symbols, subframe type-3 includes five OFDMA symbols, and subframe type-4 includes nine OFDMA symbols. One frame may include one type of subframes or different types of subframes. For convenience of description, the subframe type-1 that includes six OFDMA symbols is described in the embodiments of the present invention. However, the embodiments of the present invention, which will be described later, can be applied to the other types of subframes in the same manner.

In the frequency domain, the OFDMA symbol includes a plurality of subcarriers, and the number of subcarriers is determined depending on the size of FFT. The subcarriers can be classified into data subcarriers for data transmission, pilot subcarriers for channel measurement, and null subcarriers for guard band and DC components. Examples of parameters for the OFDMA symbols include BW, $N_{used}$, n, G, etc. The BW is a nominal channel bandwidth. $N_{used}$ is the number of subcarriers used for signal transmission. Also, n is a sampling factor, and determines subcarrier spacing and useful symbol time together with BW and $N_{used}$. G is a ratio between CP time and useful time.

In the frequency domain, resources can be grouped in a predetermined number of subcarriers. A group comprised of a predetermined number of subcarriers within one subframe is referred to as a Physical Resource Unit (PRU). The resource unit is a basic unit for resource allocation, wherein the basic unit of resource allocation in the logical frequency domain will be referred to as Logical Resource Unit (LRU), and the basic unit of resource allocation in the physical frequency domain will referred to as (Physical Resource Unit, PRU). The logical resource unit (LRU) is mapped into the physical resource unit (PRU) through frequency permutation. The permutation means a procedure of mapping a physical resource of a predetermined unit into a logical resource. As the permutation is applied to the frequency resource on the frequency axis, the signals are transmitted by being distributed on the frequency axis. Accordingly, even though a channel status of a specific frequency is not good, some of the transmitted signals may be prevented from being damaged. The frequency permutation may be divided into distributed permutation and localized permutation in accordance with a unit of permutation. The distributed permutation maps physical resources into logical resources per one resource unit, and the localized permutation maps physical resources into logical resources per a predetermined number of contiguous resource units.

The subframe includes a plurality of PRUs in the frequency domain. The PRU includes a plurality of continuous OFDMA symbols in the time domain and a plurality of continuous subcarriers in the frequency domain. For example, the number of OFDMA symbols within the PRU may be the same as the number of OFDMA symbols included in the subframe. Accordingly, the number of OFDMA symbols within the PRU can be determined depending on the type of the subframe. In the mean time, the number of subcarriers within the PRU may be 18. In this case, the PRU includes 6 OFDM symbols×18 subcarriers. The PRU can be denoted as a Distributed Resource Unit (DRU) or a Contiguous Resource Unit (CRU) depending on a resource allocation type. A basic permutation unit of a downlink DRU is a tile that includes 6 subcarriers and $N_{sym}$ symbols. A basic permutation unit of a downlink DRU is a tone-pair that includes two subcarriers and one symbol. In case of the subframe type-1, one PRU includes 108 tones. A tone can be also referred to as a resource element. The Contiguous Logical Resource Units (CLRU) are obtained from direct mapping of the CRU. Two types of CLRUs (subband LRU and miniband LRU) are supported respectively by two types of CRUs (subband based CRU and miniband based CRU).

The subframe can be divided into at least one Frequency Partition (FP) in the frequency domain. The FP can be used for Fractional Frequency Reuse (FFR). Each FP includes one or more PRUs. Distributed resource allocation and/or contiguous resource allocation can be applied to each FP. A Logical Resource Unit (LRU) is a basic logical unit for distributed resource allocation and contiguous resource allocation. A Logical Distributed Resource Unit (LDRU) includes a plurality of subcarriers (Sc) distributed within the frequency band. The LDRU has the same size as that of the PRU. The LDRU is also referred to as a distributed LRU (DLRU). A Logical Contiguous Resource Unit (LCRU) includes contiguous subcarriers (Sc). The LCRU has the same size as that of the PRU. The LCRU is also referred to as a contiguous LRU (CLRU).

A frequency band may be divided into subbands and/or minibands, each including a predetermined number of resource units (RUs). A subband includes $N_1$ (e.g. 4) consecutive PRUs and a miniband includes $N_2$ (e.g. 1) consecutive PRUs.

The aforementioned structure is only exemplary. Accordingly, various modifications can be made in the length of the superframe, the number of subframes included in the superframe, the number of OFDMA symbols included in the subframe, and parameters of OFDMA symbols. For example, the number of subframes included in the frame can be varied depending on the channel bandwidth and the CP length.

In the mean time, a maximum of four synchronization signals may be transmitted in one superframe. For example, in the IEEE 802.16m system, a downlink synchronization signal includes a primary synchronization signal and a secondary synchronization signal, wherein the primary synchronization signal includes a PA-Preamble and the secondary synchronization signal includes an SA-Preamble. In the FDD mode and the TDD mode, each of the PA-Preamble, the SA-Preamble or a downlink Location Based Service (DL LBS) location beacon is located at the first symbol of each frame. The PA-Preamble carries system bandwidth and carrier configuration information. Accordingly, the UE can obtain system bandwidth and carrier configuration information from the PA-Preamble. The SA-preamble is respectively transmitted on the first symbols within the first and third frames during one superframe. The UE may detect cell ID of the corresponding BS or perform cell scanning during handover by detecting the SA-preamble transmitted twice within one superframe.

In more detail, the PA-preamble is located at the first symbol of the second frame F1 within the superframe, and the SA-preamble is located at the first symbols of the other three frames F0 and F2. The first symbol of the last frame F3 within the superframe contains the DL LBS location beacon if the superframe is for location measurement for DL LBS, or the first symbol of the last frame F3 within the superframe contains a data signal.

On the other hand, a ranging signal for uplink synchronization may be transmitted through an uplink (UL) ranging channel (RCH). The UL ranging channel (RCH) is used for UL synchronization. The UL RCH can be further classified into non-synchronized ranging channel (NS-RCH) and synchronized ranging channel (S-RCH) for non-synchronized and synchronized UEs, respectively. The S-RCH is used for periodic ranging. The NS-RCH is used for initial access and handover. The periodic ranging may indicate an operation and procedure for enabling a UE to periodically update UL synchronization. The initial access ranging may indicate an operation and procedure for uplink time/frequency synchronization acquisition when a UE initially accesses a wireless communication system. The handover ranging may indicate, when a UE is handed over from a current BS to a different BS, an operation and procedure for establishing initial synchronization with the aforementioned different BS.

Ranging is the process of acquiring the correct timing offset, frequency offset and power adjustments so that the UE's transmissions are aligned with the BS, and they are received within the appropriate reception thresholds. After DL synchronization, the UE attempts to perform initial ranging with the BS. If the ranging procedure is successfully completed, the UE is UL synchronized to the BS.

Figure 6:
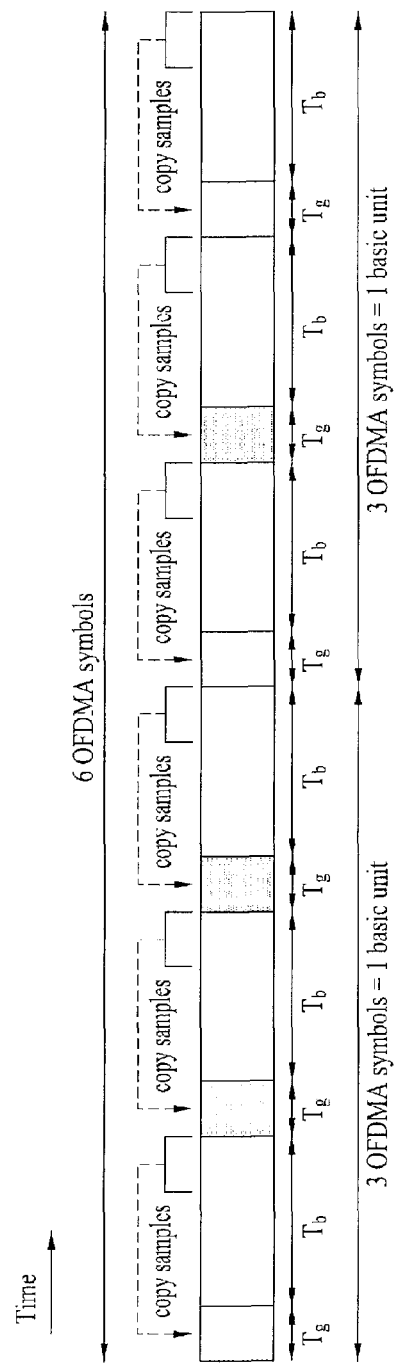

FIGS. 5 and 6 illustrate a ranging channel structure available to the embodiments of the present invention in a time domain. Specifically, FIG. 5 exemplarily shows a ranging channel (RCH) for non-synchronized UEs, and FIG. 6 exemplarily shows a ranging channel (RCH) for synchronized UEs.

Referring to FIG. 5, The NS-RCH is used for initial network entry and association and for ranging against a target BS during handover. A physical NS-RCH consists of the ranging preamble (RP) with length of $T_{RP}$ depending on the ranging subcarrier spacing $\Delta f_{RP}$, and the ranging cyclic prefix (RCP) with length of $T_{RCP}$ in the time domain. RCP is the copy of the rear part of RP, without phase discontinuity between RCP and RP. A NS-RCH occupies a localized bandwidth corresponding to 1 subband. The NS-RCH may be composed of two formats. Referring to FIG. 5(a), NS-RCH of Format 0 is constructed in one UL subframe. Referring to FIG. 5(b), NS-RCH of Format 1 is constructed in three UL subframes. The transmission start time of the NS-RCH is aligned with the corresponding UL AAI subframe start time at the DL synchronized UE.

Referring to FIG. 6, the S-RCH is used for periodic ranging. A UE that is already synchronized to a target BS is allowed to transmit the periodic ranging signal. The physical structure of S-RCH may occupy 72 subcarriers by 6 OFDMA symbols starting from the first OFDMA symbol within a subframe. In other words, one S-RCH occupies a localized band corresponding to one subband. There are two repeated signal waveforms in the S-RCH and each signal waveform as a basic unit is generated by the ranging preamble code over 72 subcarriers by 3 OFDMA symbols. In FIG. 6, $T_b$ is defined as a useful symbol time, and $T_g$ is defined as a CP time. $T_b$ is defined as $1/\Delta f$, and $T_g$ is defined as G. $T_b$. In this case, G is the ratio of CP time ($T_g$) to useful symbol time ($T_b$). For example, G may be set to any one of ¼, ⅛, 1/16, etc.

UE may recognize a time position of NS-RCH or S-RCH by broadcast signaling from the BS. NS-RCH or S-RCH may be allocated per one or more frame/superframe periods, and may be allocated to a subframe position shifted by a specific subframe offset at every allocation period.

A frequency position of NS-RCH or S-RCH may be cell-specifically determined without additional signaling. For example, A subband allocated to NS-RCH and a subband allocated to S-RCH may be determined by a cell ID (IDcell) and the number ($Y_{SB}$) of allocated subbands as shown in Equations 1 and 2.

$$I_{SB} = \mod(ID\text{cell}, Y_{SB}) \quad \text{[Equation 1]}$$

In Equation 1, $I_{SB}$ is a subband index (0, . . . , $Y_{SB}$-1) allocated to NS-RCH from among $Y_{SB}$ subbands.

$$I_{SB,s} = \mod(ID\text{cell}+1, Y_{SB}) \quad \text{[Equation 2]}$$

In Equation 2, $I_{SB,s}$ is a subband index (0, . . . , $Y_{SB}$-1) allocated to S-RCH from among $Y_{SB}$ subbands.

A total number ($Y_{SB}$) of subbands ranging over all the frequency partitions may be calculated by the following equation 3.

$$Y_{SB} = \sum_{m=0}^{3} \frac{L_{SB-CRU,FP_m}}{N_1} \quad \text{[Equation 3]}$$

In Equation 3, $L_{SB-CRU,FP_m}$ is the number of subband CRUs allocated to a frequency partition (FPi).

The frequency location of the RCH based on Equation 1 to Equation 3 is only exemplary.

The NS-RCH or the S-RCH may be used to allow the base station to measure RD (Relative Delay), RTD (Round Trip Delay), RSSI (Received Signal Strength Indication), etc. However, if the existing RCH is used to perform location measurement, since the frequency location of the existing RCH is determined by a cell-specific parameter, for example, cell ID, ranging signal transmission to the serving base station and the neighboring base station is interfered by the data signal transmitted to the neighboring base station and the serving base station through a radio resource allocated to the RCH. For this reason, it is difficult for the user equipment to measure location related parameters such as RD, RTD and RSSI with higher accuracy by means of the ranging signal transmitted through the existing RCH. Accordingly, the present invention suggests methods for configuring RCH for LBS such that base stations may determine a location of a user equipment more accurately by acquiring accurate transmission time/arrival time of a location measurement signal transmitted from the user equipment. Hereinafter, for description of the embodiments according to the present invention, the ranging channel on which a ranging signal for LBS is transmitted will be referred to as RCH, and a synchronization signal for LBS will be referred to as LBS ranging signal, LBS ranging preamble, or UL LBS location beacon.

<UL LBS Zone>

Meanwhile, in the present invention, in order to minimize an influence of LBS RCH allocation on the system, the LBS RCH is allocated for predetermined superframe(s)/frame(s)/subframe(s) not all superframes/frams/subframes in view of a time domain, and the LBS RCH is allocated for some frequency bands not all uplink frequency bands in view of a frequency domain. Hereinafter, for description of the embodiments according to the present invention, a time period for which the LBS RCH for transmitting a location measurement signal from one user equipment to base station(s) is allocated will be referred to as UL LBS zone. In other words, the UL LBS zone means allocated time and frequency resources of the LBS RCH, in which the user equipment transmits UL LBS location beacon. The UL LBS zone configured in accordance with the embodiments of the present invention, which will be described later, enables measurement of location related parameters (RD, RTD, RSSI, etc.) with higher accuracy.

The present invention includes an embodiment in which one UL LBS zone exists over one superframe/frame, and an embodiment in which one UL LBS zone exists over a plurality of contiguous superframes/frames. Also, the present invention includes an embodiment in which the number of superframes/frames where one UL LBS zone spans is fixed, and an embodiment in which the number of superframes/frames is not fixed.

In the meantime, the present invention includes an embodiment for periodically allocating UL LBS zone. The UL LBS zone may be allocated in accordance with one period which is predefined, or may be allocated in accordance with different periods per user equipment or base station.

The present invention includes an embodiment in which transmission timing and configuration of the UL LBS zone, such as the number of superframes/frames where the UL LBS zone spans, the location of the subframe, and a transmission period of the UL LBS zone, are determined by the base station participating in location measurement, and then are broadcasted to the user equipment. Also, the present invention includes an embodiment in which transmission timing and configuration of the UL LBS zone are determined by the user equipment, which is a target of location measurement, and then are transmitted to neighboring base stations of the user equipment.

The user equipment for LBS should know subframe(s) within a corresponding superframe/frame of a plurality of superframes/frames, which configure(s) the UL LBS zone, to transmit the LBS RCH for the corresponding time period. Also, each base station participating in location measurement should know superframe/frame of a plurality of superframes/frames, which belongs to the UL LBS zone, to perform location measurement for LBS.

If the user equipment determines transmission timing and configuration of the UL LBS zone, it may signal the number of superframes/frames where the UL LBS zone spans, to the base stations participating in location measurement of the user equipment. Also, the user equipment may signal information indicating a transmission period of the UL LBS zone to the base station.

If the base station determines transmission timing and configuration of the UL LBS zone, it may broadcast the number of superframes/frames where the UL LBS zone spans, to the user equipment. In other words, the base station may control activation or transmission period of the UL LBS zone. If the UL LBS zone is activated, the UL LBS zone may be transmitted periodically. The base station may signal information indicating activation of the UL LBS zone or a transmission period of the UL LBS zone to the user equipment. To this end, MAC control message, SFH, A-MAP (advanced MAP), etc. may be used. For example, the base station may broadcast the transmission period of the UL LBS zone as follows.

TABLE 1

| | Periodicity of UL LBS zone |
|---|---|
| 1 | UL LBS zone transmission is switched off |
| 2 | $N_{superframe} = 4$ |
| 3 | $N_{superframe} = 16$ |
| 4 | $N_{superframe} = 32$ |

Referring to Table 1, the user equipment transmits $N_{superframe}$ number of UL LBS zones. For another example, the base station may broadcast the transmission period of the UL LBS zone as follows.

TABLE 2

| | Periodicity of UL LBS zone |
|---|---|
| 1 | UL LBS zone transmission is switched off |
| 2 | $N_{frame} = 4$ |
| 3 | $N_{frame} = 16$ |
| 4 | $N_{frame} = 32$ |

Referring to Table 2, the user equipment transmits the UL LBS zone per $N_{frame}$ number of frames.

Hereinafter, embodiments for configuring LBS RCH in the UL LBS zone configured in accordance with any one of the aforementioned embodiments will be described in view of the time domain and the frequency domain, respectively.

<1. LBS RCH Configuration in Time Domain>

Embodiment 1-1

Allocation of Time Resources of LBS RCH Beyond Location of Existing RCH

The LBS RCH may be allocated such that transmission of ranging signal for UL LBS may not collide with transmission of existing NS-RCH and S-RCH. Since transmission periods of the NS-RCH and the S-RCH are broadcasted or multicasted to the user equipment, the user equipment and the base station may know the transmission location of the existing RCH. Also, even in case of the RCH transmitted non-periodically, since information on transmission timing of the non-periodic RCH is shared between the user equipment and the base station, the user equipment may allocate the LBS RCH by avoiding the transmission timing of the existing periodic RCH or the non-periodic RCH. A method for allocating time resources to LBS RCH so as not to collide with existing RCH transmission will be described exemplarily.

As described above, the NS-RCH and the S-RCH are allocated to a location of a subframe shifted as much as specific subframe offset $O_{SF}$ per transmission period in accordance with a period of one or more frames/superframes. The transmission timing of the LBS RCH may be determined on the basis of the transmission timing of the NS-RCH or the S-RCH. For example, if the subframe offset $O_{SF}$ of the NS-RCH or the S-RCH is set to a value between 0 and 3, it may be defined that the LBS RCH may be allocated to the location of the $O_{SF}+1$th subframe at a specific frame configured or indicated as the UL LBS zone. This is because that the specific frame may be the frame in which the existing periodic RCH is transmitted. However, since the NS-RCH of format 1 is configured over three subframes, if signaling of the NS-RCH of the format 1 is configured, it may be defined that the LBS RCH is allocated to the location of the $O_{SF}+3$th subframe within the specific frame.

Alternatively, considering a small number of UL subframes, it may be defined that the LBS RCH is allocated to the mod($O_{SF}+1,N_{UL}$)th subframe within the specific frame. In this case, $N_{UL}$ indicates the number of UL subframes.

Embodiment 1-2

Allocation of Time Resources of LBS RCH Regardless of Existing RCH Resources

The LBS RCH may be transmitted for the first or last UL subframe within a superframe configured or indicated as the UL LBS zone, regardless of a frame where existing periodic RCH transmission is performed. If transmission of the LBS RCH collides with transmission of the NS-RCH/S-RCH, for LBS, transmission of the NS-RCH/S-RCH may be dropped at the corresponding timing and the LBS RCH may be transmitted.

Embodiment 1-3

Reuse of Location of Existing RCH

The existing NS-RCH or S-SCH which is periodically transmitted may be reused, whereby the LBS RCH may be transmitted. If the NS-RCH/S-RCH is transmitted in accordance with a predetermined period $P_{RCH}$, the NS-RCH/S-RCH corresponding to an integer multiple of the predetermined period may carry the LBS RCH. The integer multiple may be a fixed value, or may be a value defined by the user equipment or the base station and then signaled to the base station or the user equipment. If configuration of the LBS zone is determined by the base station, the base station may signal activation of the LBS zone and/or the transmission period of the LBS zone to the user equipment(s). For example, the base station may broadcast the transmission period of the LBS zone as illustrated in Table 1 or Table 2. Alternatively, as illustrated in Table 3, the period of NS-RCH/S-RCH replaced with the LBS RCH may be broadcasted as the transmission period of the LBS zone.

TABLE 3

| | Periodicity of UL LBS zone |
|---|---|
| 1 | UL LBS zone transmission is switched off |
| 2 | 4 |
| 3 | 8 |
| 4 | 16 |

Referring to Table 3, for example, if the base station signals to the user equipment that the period of the UL LBS zone is '8', the user equipment may replace the NS-RCH/S-RCH with the LBS RCH at a period of $8 \times P_{RCH}$.

Embodiment 1-4

Broadcast of UL LBS Transmission Period and $O_{SF\_LBS\text{-}RCH}$

The transmission timing of the NS-RCH or the S-RCH is indicated by the transmission period and $O_{SF}$. In the same manner as the existing NS-RCH or S-RCH, the transmission timing of the LBS RCH may be indicated by a transmission period $P_{LBS\text{-}RCH}$ of the LBS RCH and subframe offset $O_{SF\_LBS\text{-}RCH}$ of the LBS RCH. The transmission period $P_{LBS\text{-}RCH}$ and the subframe offset $O_{SF\_LBS\text{-}RCH}$ may be included in a broadcast message for the existing NS-RCH or S-RCH or may be included in a broadcast message newly defined for UL LBS.

<2. LBS RCH Configuration in Frequency Domain>

If time resources of the LBS RCH are allocated in accordance with any one of the aforementioned embodiments 1-1 to 1-4, a frequency resource through which the LBS RCH is transmitted in the allocated time resources may be an issue.

The frequency resource of the NS-RCH or S-RCH is determined by a cell-specific parameter at a size of 1 subband without separate signaling. It may be considered that the frequency resource of the LBS RCH is also determined by the cell-specific parameter. However, in this case, interference occurs between the LBS RCH transmitted from a user equipment of a serving cell to a neighboring cell and data communication performed by the neighboring cell together with a user equipment of the neighboring cell, whereby location measurement performance may be deteriorated. This is because that a power of a channel for data communication performed by the neighboring cell is likely to be greater than that of the LBS RCH transmitted from the serving cell to the neighboring cell in view of the neighboring cell. This will be referred to as a near-far effect. Accordingly, for accurate location measurement for LBS, in the present invention, the LBS RCH is transmitted to all of the cells or base stations, which participate in location measurement of the user equipment, through the same frequency resource. If the LBS RCH is transmitted to all of the cells or base stations through the same frequency resource, then different data may not be transmitted through the frequency resource, whereby the near-far effect may be solved.

Embodiment 2-1

Allocation to Subband of the Lowest Index

The user equipment may transmit the LBS RCH to a base station (serving base station) of a serving cell and a base station (neighboring base station) of a neighboring cell in a subframe (UL LBS subframe) to which the LBS RCH is allocated/indicated in accordance with any one of the embodiments 1-1 to 1-4, by using the same frequency resource. To this end, the user equipment may allocate the LBS RCH to a subband having the lowest index, among a plurality of subbands within an uplink frequency partition. The user equipment may transmit UL LBS location beacon for location measurement of the user equipment to each of the serving base station and one or more neighboring base stations on the UL LBS subframe through the subband of the lowest index.

In the meantime, if the uplink frequency band is divided into a plurality of frequency partitions, the LBS RCH may be allocated to the subband having the lowest index within each frequency partition. Alternatively, the LBS RCH may be allocated to the subband of the lowest index within one frequency partition, for example, within a frequency partition FP0 of reuse-1.

According to this embodiment 2-1, all of the base stations (or cells) for UL LBS may allocate the LBS RCH to the subband of the lowest index and detect/receive the UL LBS location beacon through the LBS RCH allocated to the subband of the lowest index in UL LBS subframe time duration.

If the LBS RCH is transmitted on the subband of the lowest index in accordance with the embodiment 2-1 of the present invention, the lowest index always has the same value regardless of a size of a system frequency bandwidth. In this case, it is advantageous in that a logical frequency resource to which the LBS RCH is allocated is not changed. For example, if $Y_{SB}$ number of subbands are included in the frequency band, the lowest index 0 to the highest index $Y_{SB}$-1 may be given to the $Y_{SB}$ number of subbands. In this case, the lowest index becomes 0 regardless of the size of the frequency band but depends on the frequency band. For example, the lowest subband index is 0 but the lowest subband index becomes 5 and 11, respectively, at the frequency bands of 5 MHz and 10 MHz.

Embodiment 2-2

Allocation to Subband of the Highest Index

Generally, the LBS RCH may be allocated in accordance with the embodiment 2-1. However, if FDM-based UL PUSC zone is formed to support the legacy system, the highest index and the lowest index are given in the FDM-based UL PUSC zone unlike the general case. Accordingly, if the UL LBS zone is formed within the FDM-based UL PUSC zone, the LBS RCH is allocated to the frequency resource of the highest index to maintain commonality with the existing RCH. This will be described as follows.

The FDM-based UL PUSC zone means a radio resource where data of a legacy user equipment and an advanced user equipment are multiplexed by a frequency division multiplexing (FDM) manner. Uplink data of the legacy user equipment and uplink data of the advanced user equipment may be multiplexed by the FDM manner and then transmitted together for a predetermined time period.

Figure 7:
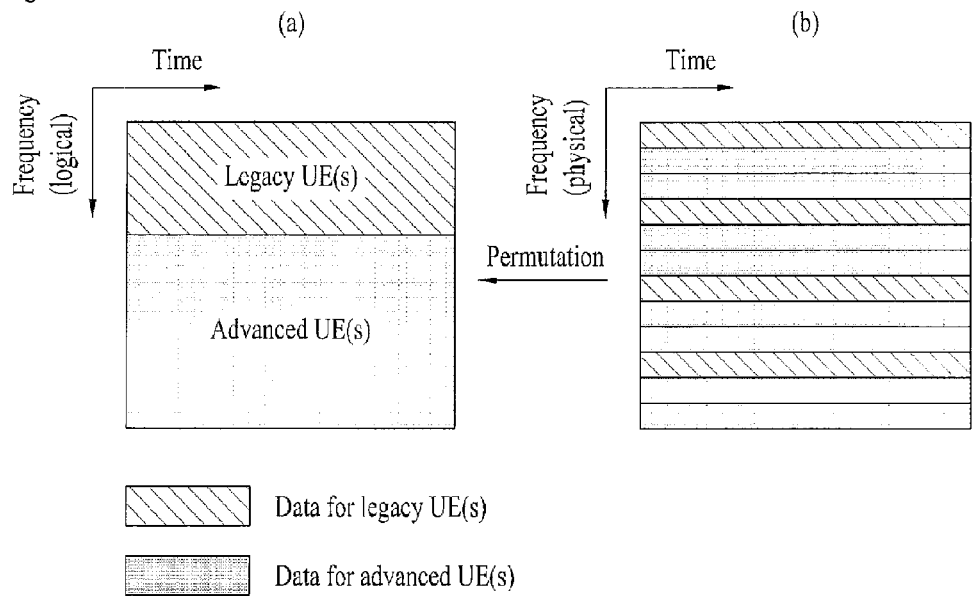
FIG. 7 is a conceptual diagram illustrating a method for multiplexing data of a legacy user equipment and data of an advanced user equipment and a mapping procedure of physical frequency resources into logical frequency resources through permutation.

FIG. 7 is a conceptual diagram illustrating a method for multiplexing data of a legacy user equipment and data of an advanced user equipment and a mapping procedure of physical frequency resources into logical frequency resources through permutation.

Referring to FIG. 7(a), the FDM manner is to distribute available frequency resources to one or more legacy user equipments and one or more advanced user equipments. In other words, according to the FDM manner, subcarriers for the legacy user equipment and subcarriers for the advanced user equipment coexist in the same symbol.

Permutation means a procedure of mapping a physical resource of a predetermined unit into a logical resource. As frequency permutation is applied to a frequency resource on a frequency axis, signals are transmitted by being distributed on the frequency axis at the corresponding bandwidth. Accordingly, even though a channel status of a specific frequency is not good, not all of the transmitted signals may be damaged. Generally, according to the frequency permutation, random sequences are generated using a specific seed, whereby the physical frequency resources are mapped into the logical frequency resources.

Figure 8:
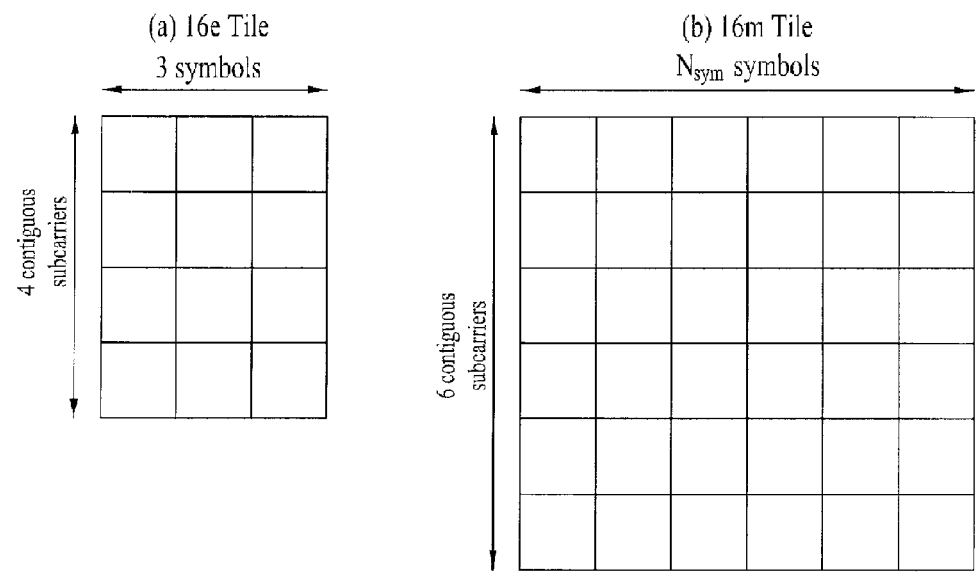
FIG. 8 is a diagram illustrating an uplink tile structure based on IEEE 802.16e and an uplink tile structure based on IEEE 802.16m.

FIG. 8 is a diagram illustrating an uplink tile structure based on IEEE 802.16e and an uplink tile structure based on IEEE 802.16m.

On the uplink of the IEEE 802.16e, one slot includes three OFDM symbols and one subchannel. 48 data subcarriers and 24 pilots exist in each slot. One subchannel includes six uplink tiles. Referring to FIG. 8(a), each tile includes four contiguous subcarriers in the IEEE 802.16e.

Available subcarriers within the frequency band allocated to a specific user equipment are divided into $N_{tile}$ number of physical tiles. The $N_{tile}$ number of physical tiles are allocated to logical tiles within the subchannels in accordance with a predetermined rule.

Figure 9:
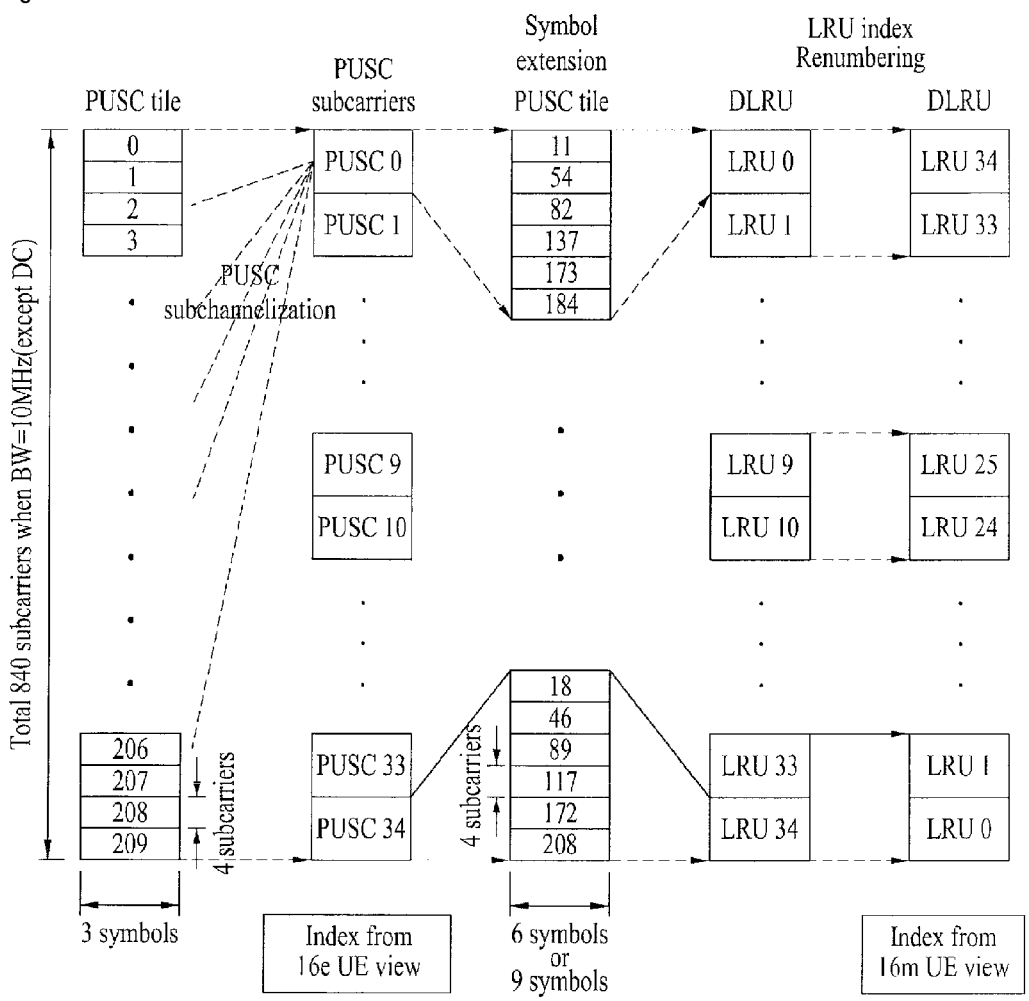
FIG. 9 is a diagram illustrating a brief mapping procedure to a subchannel of a subcarrier.

FIG. 9 is a diagram illustrating a brief mapping procedure to a subchannel of a subcarrier.

The $N_{used}$ number of subcarriers are divided into a plurality of PUSC tiles. The PUSC tiles are subjected to permutation in accordance with a predetermined rule. All the PUSC tiles of the subchannels, which are subjected to permutation, are extended from 3 OFDM symbols to $N_{sym}$ OFDM symbols in the time domain, wherein $N_{sym}$ depends on a type of the subframe. For example, if uplink transmission is performed through the subframe type-1, $N_{sym}$=6 is obtained, and if uplink transmission is performed through the subframe type-4, $N_{sym}$=9 is obtained. DLRU for IEEE 802.16m is obtained on the basis of the symbol extended tiles, and if distributed LRU indexes are numbered in reverse order of PUSCH subchannel indexes, the mapping procedure of the subcarriers into the subchannels is completed.

As will be aware of it from FIG. 9, LRU indexes are rearranged in reverse order in the FDM-based PUSC zone. Accordingly, the LBS RCH should be allocated to the DLRU of the highest index in the FDM-based PUSC zone where the LRU indexes are rearranged during frequency permutation, whereby the same effect as that the LBS RCH is allocated to the DLRU of the lowest index in the other zones not the FDM-based PUSC zone may be obtained.

Accordingly, the user equipment connected with the base station by FDM-based PUSC support mode transmits the LBS RCH to the base station and neighboring base station(s) by allocating the LBS RCH to the subband of the highest index. Also, the cells and base stations joining in the UL LBS detect the UL LBS location beacon transmitted through the highest subband.

Embodiment 2-3

Allocation to Signaled Specific Subband

In the embodiments 2-1 and 2-2 of the present invention, a frequency resource to which the LBS RCH may be allocated is fixed to subband/LRU of the lowest or highest index. Accordingly, in case of the embodiments 2-1 and 2-2 of the present invention, the location of the frequency resource of the LBS RCH may not be signaled separately. Unlike the embodiments 2-1 and 2-2 of the present invention, in the embodiment 2-3 of the present invention, different frequencies are allocated to the LBS RCH in accordance with the frequency channel status. However, even in this case, all the cells or base stations for UL LBS use the same frequency resource for the LBS RCH. In other words, the user equipment transmits the LBS RCH to the serving base station and neighboring base station(s) through a specific subband.

The base station for UL LBS may broadcast information indicating a specific subband to which the LBS RCH will be allocated, to the user equipment. The user equipment may allocate the LBS RCH to the specific subband on the basis of the information and transmit the UL LBS location beacon to the base station and neighboring base station(s) through the UL LBS location beacon.

In the same manner as the embodiments 2-1 and 2-2 of the present invention, if the LBS RCH is allocated to the radio resource, a dedicated ranging channel may be allocated thereto. If the user equipment configures the UL LBS location beacon differently depending on the base station and transmits the corresponding UL LBS location beacon to each base station, it may multiplex the UL LBS location beacon(s), which will be transmitted to the base stations, into the same radio resource in accordance with a code division multiplexing (CDM) manner and transmit them to the base station(s) through the same radio resource.

Also, in the embodiments 2-1 to 2-3 of the present invention, the existing permutation rule may be applied to the other frequency resources except for the subband allocated to the LBS RCH. It is general that the permutation rule is applied cell-specifically. If the user equipment cell-specifically performs frequency permutation including the subband allocated to the LBS RCH, even though the same logical frequency resource is allocated to the LBS RCH of the base stations joining in the LBS, the UL LBS location beacon may be transmitted to each base station through different physical frequency resources per base station. Accordingly, if frequency permutation is applied to the other frequency resources only except for the frequency resource allocated to the LBS RCH, the physical frequency resource as well as the logical frequency resource may be allocated to the LBS RCH. In other words, it is advantageous in that the LBS RCH is configured cell-commonly.

Although the embodiments 2-1 to 2-3 of the present invention have been described based on the case where the frequency resource is allocated to the LBS RCH at a size of one subband, the LBS RCH may be allocated at a different size not one subband. However, since the NS-RCH and the S-RCH occupy the frequency resource of one subband size, if the LBS RCH is allocated to occupy the frequency resource of the subband, it is advantageous in that the NS-RCH or S-RCH may be reused in the embodiment 1-3. Also, it is advantageous in that the structure of the LBS RCH may be the same as that of the existing RCH in the frequency domain.

According to the aforementioned embodiments of the present invention, the LBS RCH for accurate location measurement of the user equipment may be allocated while minimizing an influence on the existing RCH.

Also, signal interference of the UL LBS location beacon to the serving base station and the neighboring base station may be reduced, whereby better location measurement performance of the user equipment may be obtained.

Figure 10:
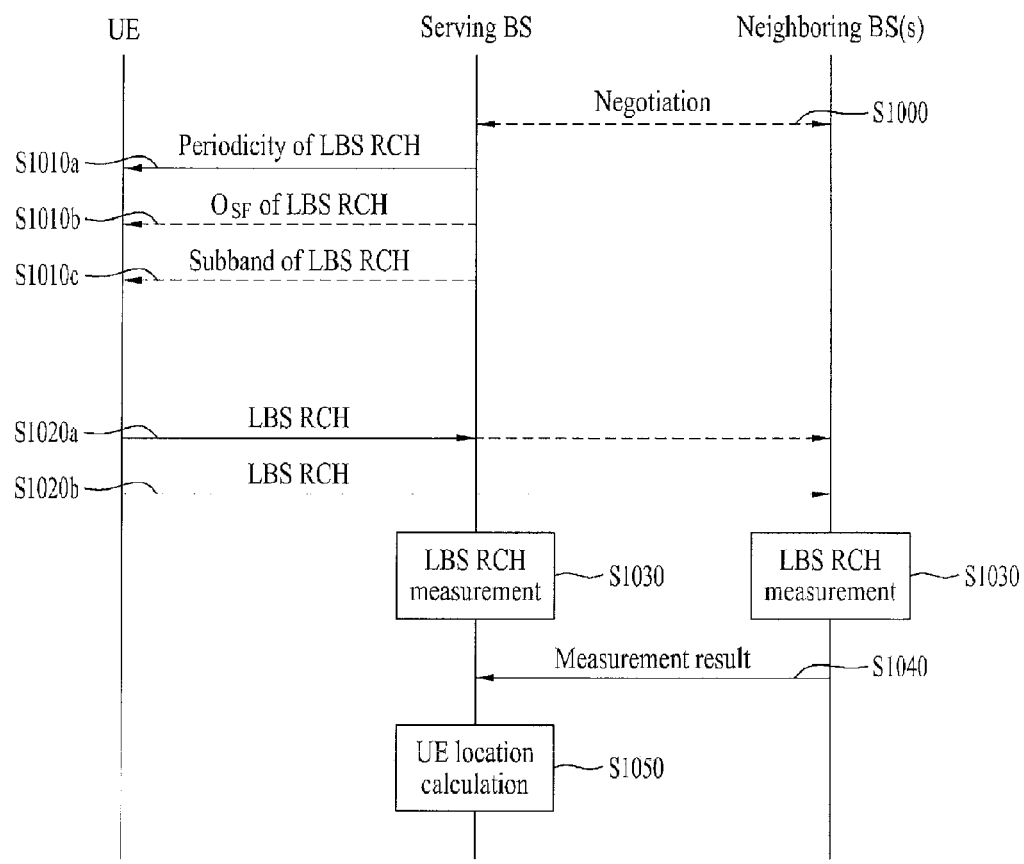
FIG. 10 is a brief flow chart illustrating user equipment location measurement based on uplink signals according to the embodiments of the present invention.

FIG. 10 is a brief flow chart illustrating user equipment location measurement based on uplink signals according to the embodiments of the present invention.

Referring to FIG. 10, the serving base station may trigger transmission of the UL LBS zone to the user equipment(s) within coverage of the serving base station (S1010a). If the serving base station desires to trigger transmission of the UL LBS zone to the user equipment, it may signal information indicating activation of the UL LBS zone to the user equipment. If the transmission period of the UL LBS zone is not defined previously, the serving base station may trigger transmission of the UL LBS zone by signaling the transmission period of the UL LBS zone. The information indicating activation of the UL LBS zone may be broadcasted to the user equipment(s) within the serving base station through SFH, MAC control message, A-MAP, etc.

The serving base station may signal information on a location of UL LBS subframe (S1010b). For example, the serving base station may further broadcast offset $O_{SF\_LBS-RCH}$ of the UL LBS subframe together with the transmission period of the UL LBS subframe (S1010b). In particular, in the same manner as the embodiment 1-4 of the present invention, if it is not predefined whether a subframe of a superframe or frame will be used as UL LBS subframe, the serving base station signals information indicating the UL LBS subframe to the user equipment. However, the serving base station according to the embodiments 1-1 to 1-3 of the present invention may signal the information on the location of the UL LBS subframe.

Also, the serving base station may signal information indicating the frequency resource allocated to the LBS RCH (S1010c). In particular, in the same manner as the embodiment 2-3 of the present invention, if the frequency resource allocated to the LBS RCH is not defined previously, the serving base station broadcasts the information on the frequency resource allocated to the LBS RCH, for example, subband index. The serving base station according to the embodiment 2-1 or 2-2 of the present invention may signal the information indicating the frequency resource.

In the meantime, the serving base station may negotiate configuration of the LBS RCH by performing communication with neighboring base station(s) which will join in location measurement for LBS (S1000). For example, the serving base station may negotiate activation and/or transmission period of the UL LBS zone, the location of the UL LBS subframe, frequency location of the LBS RCH, etc. with the neighboring base station(s). The serving base station may transmit activation of the LBS zone, transmission timing of the LBS RCH and/or information on frequency location to the user equipment on the basis of the negotiated result (S1010a-1010c).

The user equipment allocates the LBS RCH to the UL LBS subframe allocated or indicated to the transmitted information in accordance with any one of the embodiments 1-1 to 1-4 of the present invention. Also, the user equipment allocates the frequency resource to the LBS RCH in accordance with any one of the embodiments 2-1 to 2-3 of the present invention. The user equipment transmits the UL LBS location beacon to the serving base station through the allocated frequency resource in the UL LBS subframe (S1020a). The LBS location beacon is also transmitted to the neighboring base station(s) through the allocated predetermined frequency resource during the UL LBS subframe (S1020a). In the meantime, the user equipment may transmit a separate UL LBS location beacon for the neighboring base station(s) through the allocated frequency resource in the UL LBS subframe (S1020b). In this case, the user equipment transmit the UL LBS location beacon for the serving base station and the UL LBS location beacon for the neighboring base station for the same time and frequency resources by multiplexing them into the dedicated LBS RCH.

The serving base station may measure location related parameters of the user equipment, such as RD, RTD and RSSI, by using the LBS RCH received through the predetermined frequency resource in the UL LBS subframe (S1030). The neighboring base station(s) may measure the location related parameters of the user equipment, such as RD, RTD and RSSI, by using the UL LBS location beacon transmitted to the serving base station (S1020a) or the UL LBS location beacon transmitted to the neighboring base station (S1020b) through the predetermined frequency resource in the UL LBS subframe.

The neighboring base station(s) report the measured result to the serving base station (S1040). The serving base station calculates the location of the user equipment on the basis of the location related information of the user equipment, which is reported from the neighboring base station(s), and the location related information measured by the serving base station (S1050).

The serving base station may provide a location based service to the user equipment on the basis of the calculated result.

The processor 400b of the serving base station may generate information triggering transmission of the UL LBS zone to the user equipment(s) within coverage of the serving base station. The processor 400b may include the information in the SFH, MAC control message, A-MAP, etc. If the serving base station desires to trigger transmission of the UL LBS zone to the user equipment, the processor 400b of the serving base station may control the transmitter 100b of the serving base station to transmit the information indicating activation of the UL LBS zone. The information indicating activation of the UL LBS zone may be the transmission period information of the UL LBS zone.

The processor 400b of the serving base station may control the transmitter 100b of the serving base station to signal the information on the location of the UL LBS subframe (S1010b). For example, the processor 400b of the serving base station may control the transmitter 100b of the serving base station to broadcast offset $O_{SF\_LBS-RCH}$ of the UL LBS subframe together with the transmission period of the UL LBS subframe (S1010).

Also, the processor 400b of the serving base station may control the transmitter 100b of the serving base station to signal the information indicating the frequency resource allocated to the LBS RCH.

The receiver 300a of the user equipment receives activation information (and/or offset $O_{SF\_LBS-RCH}$ information of the UL LBS subframe and/or information indicating the frequency resource allocated to the LBS RCH) of the UL LBS zone, which is transmitted from the serving base station, and transfers the received information to the processor 400a of the user equipment.

The processor 400a of the user equipment allocates the LBS RCH to the allocated or indicated UL LBS subframe in accordance with any one of the embodiments 1-1 to 1-4 of the present invention. Also, the processor 400a of the user equipment allocates the frequency resource to the LBS RCH in accordance with any one of the embodiments 2-1 to 2-3 of the present invention. The processor 400a of the user equipment controls the transmitter 100a of the user equipment to transmit the UL LBS location beacon to the serving base station through the allocated or indicated frequency resource in the UL LBS subframe. The LBS location beacon may also be transmitted to the neighboring base station(s) through the allocated predetermined frequency resource in the UL LBS subframe. In the meantime, the processor 400a of the user equipment may control the transmitter 100a of the user equipment to transmit a separate UL LBS location beacon for the neighboring base station(s) through the allocated frequency resource in the UL LBS subframe. In this case, the processor 400a of the user equipment may multiplex the UL LBS location beacon for the serving base station and the UL LBS location beacon for the neighboring base station into the dedicated LBS RCH to transmit the UL LBS location beacons for the same time and frequency resources.

The processor 400b of the serving base station may measure location related parameters of the user equipment, such as RD, RTD and RSSI, by using the LBS RCH received through the predetermined frequency resource during the UL LBS subframe. The processor(s) of the neighboring base station(s) may measure the location related parameters of the user equipment, such as RD, RTD and RSSI, by using the UL LBS location beacon transmitted to the serving base station (S1020a) or the UL LBS location beacon transmitted to the neighboring base station (S1020b) through the predetermined frequency resource in the UL LBS subframe.

The processor(s) of the neighboring base station(s) control the corresponding transmit to transmit the measured result to the serving base station. The receiver 300b of the serving base station receives the location related information of the user equipment, which is reported from the neighboring base station(s), and transfers the received information to the processor 400b of the serving base station. The processor 400b of the serving base station may calculate the location of the user equipment on the basis of the location related information reported from the neighboring base station(s) and the location related information measured by the serving base station.

Although uplink signal based location measurement of the user equipment has been described based on the case where three base stations join in location measurement of the user equipment in FIG. 1, two base stations may join in location measurement of the user equipment if the serving base station knows the distance between the serving base station and its neighboring base station.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The embodiments of the present invention can be applied to a base station, a user equipment, or other communication devices in a wireless communication system.

What is claimed is:

1. A method for transmitting, by a user equipment, an uplink location measurement signal for a location based service (LBS) in a wireless communication system, the method comprising:
    transmitting the uplink location measurement signal to a serving base station and one or more neighboring base stations in a predetermined uplink subframe during an uplink LBS zone configured for transmission of the uplink location measurement signal,
    wherein the uplink location measurement signal is transmitted through a subband of which index is the highest among a plurality of subbands used at each of the serving and neighboring base stations when the uplink LBS zone is configured in a frequency division multiplexing (FDM) based uplink partial usage of subchannels (PUSC) zone, or the lowest among the plurality of subbands used at each of the serving and neighboring base stations.

2. The method according to claim 1, further comprising:
    receiving broadcast information including a subframe offset $O_{SF}$ for a ranging channel and periodicity information indicating a transmission period for the ranging channel,
    wherein the predetermined uplink subframe is an '$O_{SF}+1$'-th subframe in subframes corresponding to the transmission period or a 'mod($O_{SF}+1$, $N_{UL}$)'-th subframe in the subframes corresponding to the transmission period, wherein $N_{UL}$ is a number of subframes included in a frame.

3. The method according to claim 2, further comprising:
    transmitting the ranging channel through a subband determined on a basis of a cell identity of the serving base station.

4. The method according to claim 1, further comprising:
    receiving subframe information indicating the predetermined uplink subframe from the serving base station.

5. The method according to claim 1, further comprising:
    performing a frequency permutation, except the subband through which the uplink location measurement signal is transmitted, for mapping physical frequency resources to logical frequency resources.

6. A method for receiving, by a base station, an uplink location measurement signal for a location based service (LBS) in a base station of a wireless communication system, the method comprising:
    receiving the uplink location measurement signal from a user equipment in a predetermined uplink subframe during an uplink LBS zone configured for reception of the uplink location measurement signal,
    wherein the uplink location measurement signal is received through a subband of which index is the highest among a plurality of subbands used at the base station, when the uplink LBS zone is configured in a frequency division multiplexing (FDM) based uplink partial usage of subchannels (PUSC) zone, or the lowest among the plurality of subbands used at the base station.

7. The method according to claim 6, further comprising:
    transmitting broadcast information including a subframe offset $O_{SF}$ for a ranging channel and periodicity information indicating a reception period for the ranging channel,
    wherein the predetermined uplink subframe is an '$O_{SF}+1$'-th subframe in subframes corresponding to the reception period or a 'mod($O_{SF}+1$, $N_{UL}$)'-th subframe in the subframes corresponding to the reception period, where $N_{UL}$ is a number of subframes included in a frame.

8. The method according to claim 7, further comprising:
    receiving the ranging channel through a subband determined on a basis of a cell identity of the base station.

9. The method according to claim 6, further comprising:
    performing a frequency permutation, except the subband through which the uplink location measurement signal is received, for mapping physical frequency resources to logical frequency resources.

10. A user equipment for transmitting an uplink location measurement signal for a location based service (LBS) in a wireless communication system, the user equipment comprising:
    a receiver;
    a transmitter; and
    a processor configured to control the receiver and the transmitter,
    wherein the processor is configured to control the transmitter to transmit the uplink location measurement signal to a serving base station and one or more neighboring base stations in a predetermined uplink subframe during an uplink LBS zone configured for transmission of the uplink location measurement signal, and
    wherein the processor is configured to control the transmitter to transmit the uplink location measurement signal through a subband of which index is the highest among a plurality of subbands used at each of the serving and neighboring base stations, when the uplink LBS zone is configured in a frequency division multiplexing (FDM) based uplink partial usage of subchannels (PUSC) zone, or the lowest among the plurality of subbands used at each of the serving and neighboring base stations.

11. The user equipment according to claim 10, wherein the receiver is configured to receive broadcast information including a subframe offset $O_{SF}$ for a ranging channel and periodicity information indicating a transmission period for the ranging, channel, and the processor is configured to control the transmitter to transmit the uplink location measurement signal in the predetermined uplink subframe on the basis of the broadcast information, and wherein the predetermined uplink subframe is an '$O_{SF}+1$'-th subframe in subframes corresponding to the transmission period or a 'mod($O_{SF}+1$, $N_{UL}$)'-th subframe in the subframes corresponding to the transmission period, where $N_{UL}$ is a number of subframes included in a frame.

12. The user equipment according to claim 11, wherein the processor is configured to control the transmitter to further transmit the ranging channel through a subband determined on a basis of a cell identity of the serving base station.

13. The user equipment according to claim 10, wherein the receiver is configured to receive subframe information indicating the predetermined uplink subframe from the serving base station, and the processor is configured to control the transmitter to transmit the uplink location measurement signal in the predetermined subframe on the basis of the subframe information.

14. The user equipment according to claim 10, wherein the processor is configured to perform a frequency permutation, except the subband through which the uplink location measurement signal is transmitted, for mapping physical frequency resources to logical frequency resources.

15. A base station for receiving an uplink location measurement signal for a location based service (LBS) in a wireless communication system, the base station comprising:
a receiver;
a transmitter; and
a processor configured to control the receiver and the transmitter,
wherein the processor is configured to control the receiver to receive the uplink location measurement from a user equipment in a predetermined uplink subframe during an uplink LBS zone configured for reception of the uplink location measurement signal, and
wherein the processor is configured to receive the uplink location measurement signal through a subband of which index is the highest among a plurality of subbands used at each of the serving and neighboring base stations, when the uplink LBS zone is configured in a frequency division multiplexing (FDM) based uplink partial usage of subchannels (PUSC) zone, or the lowest among the plurality of subbands used at each of the serving and neighboring base stations.

16. The base station according to claim 15, wherein the processor is configured to control the transmitter to transmit broadcast information including a subframe offset $O_{SF}$ for a ranging channel and periodicity information indicating a reception period for the ranging channel, and wherein the predetermined uplink subframe is an '$O_{SF}+1$'-th subframe in subframes corresponding to the reception period or a 'mod($O_{SF}+1$, $N_{UL}$)'-th subframe in the subframes corresponding to the reception period, where $N_{UL}$ is a number of subframes included in a frame.

17. The base station according to claim 16, wherein the processor is configured to control the receiver to further receive the ranging channel through a subband determined on a basis of a cell identity of the base station.

18. The base station according to claim 15, wherein the processor is configured to perform a frequency permutation, except the subband through which the uplink location measurement signal is received, for mapping physical frequency resources to logical frequency resources.

\* \* \* \* \*